US009392308B2

(12) United States Patent
Ahmed et al.

(10) Patent No.: US 9,392,308 B2
(45) Date of Patent: Jul. 12, 2016

(54) CONTENT RECOMMENDATION BASED ON USER LOCATION AND AVAILABLE DEVICES

(75) Inventors: Samir Ahmed, Glendale, CA (US); Clayton Alexander Thomson, Thousand Oaks, CA (US); Joel Fogelson, Pasadena, CA (US)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 14/235,850

(22) PCT Filed: Jun. 5, 2012

(86) PCT No.: PCT/US2012/040859
§ 371 (c)(1),
(2), (4) Date: Jan. 29, 2014

(87) PCT Pub. No.: WO2013/019307
PCT Pub. Date: Feb. 7, 2013

(65) Prior Publication Data
US 2014/0196069 A1    Jul. 10, 2014

Related U.S. Application Data

(60) Provisional application No. 61/515,205, filed on Aug. 4, 2011, provisional application No. 61/515,214, filed on Aug. 4, 2011.

(51) Int. Cl.
*H04N 7/16*      (2011.01)
*H04N 21/25*    (2011.01)
(Continued)

(52) U.S. Cl.
CPC ......... *H04N 21/251* (2013.01); *H04N 21/4516* (2013.01); *H04N 21/4524* (2013.01); *H04N 21/4532* (2013.01); *H04N 21/4826* (2013.01)

(58) Field of Classification Search
CPC ............ H04N 21/251; H04N 21/4826; H04N 21/4524; H04N 21/4532; H04N 21/4516
USPC ....................................................... 725/14, 53
See application file for complete search history.

(56) References Cited

U.S. PATENT DOCUMENTS

2003/0068974 A1    4/2003    Kanamaluru et al.
2007/0157242 A1    7/2007    Cordray et al.
(Continued)

FOREIGN PATENT DOCUMENTS

EP    2207348    7/2010
GB    2448480    10/2008
(Continued)

OTHER PUBLICATIONS

Gil et al., "Profile Management System for Adaptive Content of Heterogeneous Devices", 2010 IEEE, Aug. 11-13, 2010.
(Continued)

*Primary Examiner* — Hoang-Vu A Nguyen-Ba
(74) *Attorney, Agent, or Firm* — Brian J. Dorini; Patricia A. Verlangieri

(57) ABSTRACT

A method for making a content recommendation to at least one user commences by first establishing a location for the at least one user. Thereafter a check occurs to determine which devices are available to the at least one user to use (e.g., consume) the content at the location. Next, the content available to the at least one user is determined based on at least the user's location and available devices available to the at least one user. A content recommendation is then made among the available content based on at least one attribute of the at least one user.

12 Claims, 6 Drawing Sheets

(51) Int. Cl.
  *H04N 21/45* (2011.01)
  *H04N 21/482* (2011.01)
  *G06F 3/00* (2006.01)

(56) References Cited

U.S. PATENT DOCUMENTS

2008/0104127 A1  5/2008  Billmaier et al.
2009/0089294 A1  4/2009  Davis et al.
2009/0327305 A1* 12/2009  Roberts .............. G06F 17/3089
2010/0082376 A1  4/2010  Levitt
2010/0211636 A1  8/2010  Starkenburg et al.
2010/0333137 A1  12/2010  Hamano et al.
2011/0055324 A1  3/2011  Sung et al.
2011/0138064 A1* 6/2011  Rieger et al. .................. 709/228
2012/0158769 A1  6/2012  Gratton

FOREIGN PATENT DOCUMENTS

WO  WO0004707  1/2000
WO  WO0101677  1/2001
WO  WO2009070193  6/2009

OTHER PUBLICATIONS

Search Report Dated Nov. 13, 2012.

* cited by examiner

FIGURE 3

ALL DEVICES -ALL LOCATIONS

| TIME/CHANNEL | CONTENT | DEVICE | LOCATION |
| --- | --- | --- | --- |
| ON-DEMAND | *BATMAN BEGINS* | Tablet, PC, Smart Phone | Home, Work, "Hot-Spot" |
| 8:00 -8:30 AM WMAQ Channel 5 | *Today Show* | PC TV | Home |
| 8:30-9:00 AM WBBM -AM | *Local News* | PC, TV | Home |
| On-Demand | PANDORA -*Elton John* | Tablet, PC, Smart Phone | Home, Work |
| On-Demand | KCRW - *Live MUSIC FEED* | Tablet, Smart Phone | "Hot-Spot", Work |

FIGURE 4

PC ONLY

| TIME/CHANNEL | CONTENT | DEVICE | LOCATION |
| --- | --- | --- | --- |
| ON-DEMAND | *BATMAN BEGINS* | PC | Home |
| 8:00 -8:30 AM WMAQ Channel 5 | *Today Show* | PC | Home |
| 8:30-9:00 AM WBBM -AM | *Local News* | PC | Home |
| 9:00 -9:30 AM WMAQ Channel 5 | *After Today Show* | PC | Home |
| On-Demand | *Dark Knight* | PC | Home |

FIGURE 5

LOCATION ONLY - "HOT-SPOT"

| TIME/CHANNEL | CONTENT | DEVICE | LOCATION |
| --- | --- | --- | --- |
| ON-DEMAND | *BATMAN BEGINS* | Tablet, Smart Phone | "Hot-Spot" |
| ON-DEMAND | KCRW -LIVE MUSIC FEED | Tablet, Smart Phone | "Hot-Spot" |
| ON-DEMAND | *MSNBC VIDEO FEED* | Tablet | "Hot-Spot" |
| ON-DEMAND | SCRABBLE (game application) | Tablet | "Hot-Spot" |
| ON-DEMAND | *Styx - Paradise Theater* | Tablet | "Hot-Spot" |

FIGURE 6

SPECIFIED DEVICES SUPPORTING TWO SCREENS/SINGLE SCREEN

| TIME/CHANNEL | CONTENT | DEVICE | LOCATION |
| --- | --- | --- | --- |
| ON-DEMAND | *BATMAN BEGINS* [two screen version-enabled] | Tablet - PC (two-screen feature enabled for both devices) | Home |
| 10:00-10:30 AM FX | *Archer* | PC, TV | Home |
| 10:30 AM-12:30 PM HBO | *GAME OF THRONES* [two screen version-enabled] | Tablet - PC (two-screen feature enabled for both devices) | Home |
| ON-DEMAND | BATMAN BEGINS [two screen version -disabled] | Tablet, PC Smart Phone | Work, Hot-Spot |
| ON-DEMAND | *PANDORA - Elton John* | Tablet, PC, Smart Phone | Home, Work |

CONTENT RECOMMENDATION BASED ON USER LOCATION AND AVAILABLE DEVICES

CROSS-REFERENCE TO RELATED APPLICATIONS

This application claims the benefit, under 35 U.S.C. §365 of International Application PCT/US2012/040859, filed Jun. 5, 2012, which was published in accordance with PCT Article 21(2) on Feb. 7, 2013 in English and which claims the benefit of U.S. provisional patent application No. 61/515,205, filed Aug. 4, 2011 and U.S. provisional patent application No. 61/515,214, filed Aug. 4, 2011, respectively.

TECHNICAL FIELD

This invention relates to a technique for recommending content to at least one user.

BACKGROUND ART

With the proliferations of new types of communications devices, including smart phones, tablets, laptop computers and multimedia gateways for example, as well as more traditional devices, such as set-top boxes, consumers now make use (e.g., consume) ever increasing quantities of content (e.g., games, books, applications, music, images, movies and/or videos). To that end, content providers, such as movie studios, game developers, broadcast networks, and publishers for example, have a strong interest in recommending their content to consumers for consumption. Present day content recommendations techniques typically make recommendations based on the content previously consumed by a particular consumer. Thus, if a consumer has previously viewed a historical drama, a movie studio would likely recommend other historical dramas for viewing. Similarly, a consumer who has previously ordered video games of a certain type thus constitutes a good candidate for similar games of the same type.

Some content recommendation techniques also take account of the nature of the device through which the consumer makes a request for content. Some devices have greater capabilities than other devices. For example, a High-Definition (HD) display device or HD set-top box can handle HD movies whereas an unsophisticated cell phone cannot readily do so. Thus, knowing the capability of the device enables a content recommendation appropriate for the device to avoid potential consumer dissatisfaction. However, such content recommendation techniques assume that the user will consume content on the same device through which the user made the content request. However, consumers do not always use the same device for requesting and consuming content. In some instances, the consumer can use one type of device, such as a cell phone or a tablet, to make a content request, but use a different device, such as a HD display device to view such content. If the content provider making the content recommendation assumes the same device in both instances, the content provider will miss the opportunity to recommend a wider variety of content, and thus miss the opportunity to gain greater revenue from the consumer.

Thus, a need exists for a content recommendation technique that takes account of various factors that influence consumer content buying decisions.

BRIEF SUMMARY OF THE INVENTION

Briefly, in accordance with a preferred embodiment of the present principles, a method for making a content recommendation to at least one user commences by first establishing a location for the at least one user. Thereafter a check occurs to determine which devices are available to the at least one user to use (e.g., consume) the content at the location. Next, the content available to the at least one user is determined based on at least the user's location and available devices available to the at least one user. A content recommendation is then made among the available content based on at least one attribute of the at least one user.

BRIEF SUMMARY OF THE DRAWINGS

FIG. 3 illustrates a table of content recommendations for all devices at all locations;

FIG. 4 illustrates a table of content recommendations for a single device type;

FIG. 5 illustrates a table of content recommendations different devices at a single location; and FIG. 6 illustrates a table of content recommendations for devices at all locations that support two-screen or single screen applications.

DETAILED DESCRIPTION

Figure 1:
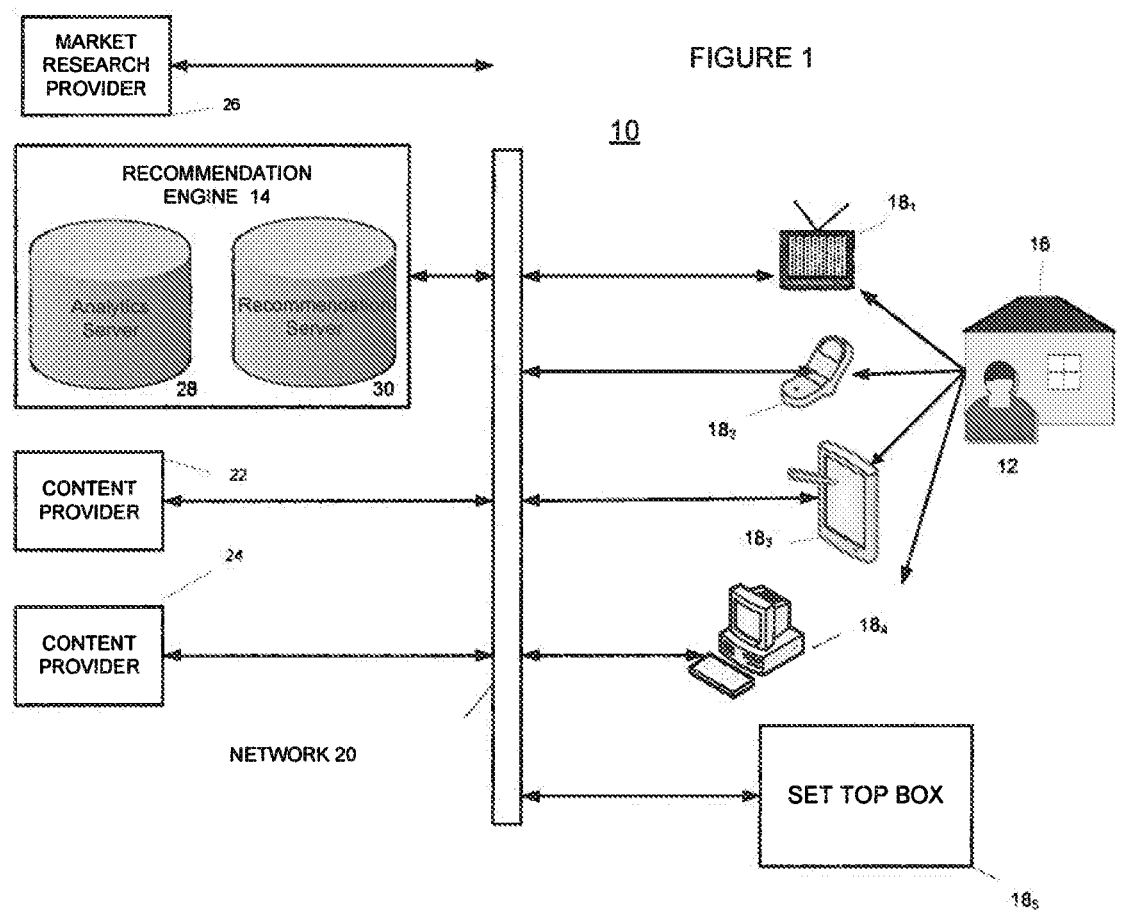
FIG. 1 depicts a block schematic diagram of a system, in accordance with a preferred embodiment of the present principles, for recommending content to at least one user.

FIG. 1 depicts a block schematic diagram of a system 10, in accordance with a preferred embodiment, for recommending content to at least one user 12. The content can include games, electronic books, applications (software), music, images, movies, television programs, and/or videos for example. The system 10 includes a recommendation engine 14 that recommends content taking into account the user's location, the available devices at that location and available content usable on such devices. In the illustrative embodiment of FIG. 1, the user's present location constitutes his/her home 16. As discussed hereinafter, the content recommendation engine 14 of the system 10 can readily provide content recommendations to users at other locations besides their residence.

In the illustrated embodiment of FIG. 1, the user 12 can use one or more devices $18_1$-$18_4$ to consume content supplied though a network 20 by one or more content providers, illustratively depicted by content providers 22 and 24. The content providers could include entities that produce the content themselves, or content aggregators that obtain and provide content from many content originators under license. Although FIG. 1 depicts the network 20 as a single element, the network 20 can comprise a combination of interconnected sub-networks, not shown, such as a combination of one or more wireless sub-networks, IP sub-networks (e.g., the Internet), a cable television sub-network, and a telecommunication sub-network.

The devices $18_1$-$18_5$ can take various forms. For example, device $18_1$ can comprise a television set having either HD or SD resolution. Device $18_2$ can take the form of a smart telephone with HD or SD resolution. Device $18_3$ can take the form of a tablet, such as for example an Apple I-PAD® or the like with HD or SD resolution. The device $18_4$ can take the form of a desktop personal computer (PC). The device $18_5$ can take the form of a set-top box having either HD or SD resolution connected to a display device (not shown). Other devices for receiving content could include a Blu-ray disk player as well. The devices thus described constitute merely examples of the wide variety of devices currently available to consume content.

Many of the devices $18_1$-$18_5$ not only have the ability to consume content, but also have the ability to initiate requests for content through the network 20 to one or more of the content providers 22 and 24. In addition, such devices also have the ability to initiate requests to the recommendation engine 14 through the network 20 for content recommendations. As discussed in detail hereinafter, the recommendation engine 14 can initiate content recommendations on its own, without having received any user input. In that regard, the recommendation engine 14 can take account of past requests for content made to one or more of the content providers 22 and 24, as well as market trend data from one or more market research providers, such as market research provider 26. Various companies such as AC Nielsen provide market research for such purposes.

A user need not make use of a content-receiving device to make a request for content or a content recommendation. A user could make use other devices that have the ability to communicate through the network 20 to the content providers 22 and 24 and the recommendation engine 14. Thus, a user could make use of a landline telephone or cell phone for this purpose. Stated another way, the user 12 can make use of one or more dual-function devices (content receiving and content requesting devices) or a combination of single purpose devices (content receiving only and content requesting only.). In this context, the ability to request content includes the ability to request a content recommendation.

Still referring to FIG. 1, the recommendation engine 14 includes an analytics server 28 and a recommendation server 30. With the appropriate permissions, the analytics server 28 interfaces with the various of the devices $18_1$-$18_5$ which each run a client to maintain information about each search performed by that device for content. By interfacing with devices that run a client to store user content search data, the analytics server 28 of the recommendation engine 14 can:
1. keep track of searches made by a user;
2. keeping track of content requests made by the user;
3. keep track of Electronic Program Guide (EPG) requests made by the user for content;
4. keep track of the content purchases/rentals made by the user;
5. keep track of devices actuated by the user and/or remain currently available to the user;
6. keep track of the user's location of a user typically using GPS/geolocation/IP address lookup; and
7. keep track of the content consumed at particular location on a particular device.

The analytics server 28 collects this and other information to create a content profile, location profile and device profile for each user. The content profile constitutes an attribute attributable to the user content desired by the user. The analytics server can take the form of a distributed server cluster that executes software such as the APACHE HADOOP software framework that supports data-intensive distributed applications that work with thousands of computational independent computers and petabytes of data.

The recommendation server 30 interfaces with the analytics server 28 and uses the profile information gained from the analytics server as well as EPG information accumulated from multiple sources to recommend available content matching the user's profile. As discussed previously, the user's profile includes a content profile, location profile and device profile for that user. In matching available content to the user's profile, the recommendation server takes account of the user's location, the ability of the devices to consume the content, as well as the ability to transmit the content to the user's location in addition to the user's past content consumption. Assume for example, the analytics server 28 has determined the user currently resides at his/her residence 16 and can receive HD content across the network 20 on the television set $18_1$, which has HD resolution. Under such circumstances, the recommendation server 30 can recommend an HD movie or television program to the user 12.

The recommendation server 30 will take account of information in the user's profile indicating the user's ability to access two or more devices at the user's present location where one device would accommodate primary content and the other device can display auxiliary content. Under such circumstances, the recommendation server 30 will make link recommendations so the one device capable of displaying primary content can display a television show for example. The other device capable of displaying auxiliary content can display additional information about the actors of the television and provide an opportunity to buy additional episodes of the television show or other content.

In an exemplary embodiment, the recommendation engine can recommend content that can be consumed with two or more devices at the same time. For example, while a user is watching a video program on a first device, the recommendation engine can note that there is auxiliary content which corresponds to the video program such as a game application, chat room, interactive application, and the like that can be activated on a second device. The auxiliary content can also sometimes be implemented where the application on the second device is synchronized with the content on the first device. For example, while a user sees a character on a first device, a second device can automatically bring up information about that character on the second device. The recommendation engine can recommend such auxiliary content when available in a manner consistent with the exemplary embodiments.

As discussed, the content recommendations proffered by the recommendation server 30 within the recommendation engine 14 take account of the user's available devices and ability to receive content. Consider for example when a user travels by car, bus, or train. Under such circumstances, the user will likely have limited device access at this location. Typically, the user might only have access to a smart phone accessible via a 3G, 4G, or Wi-Fi wireless network. Under such circumstances, the user's ability to receive and consume content becomes more restricted. Thus, the content recommendation proffered to the user will include only content capable of transmission to, and consumption the user's available device(s).

Figure 2:
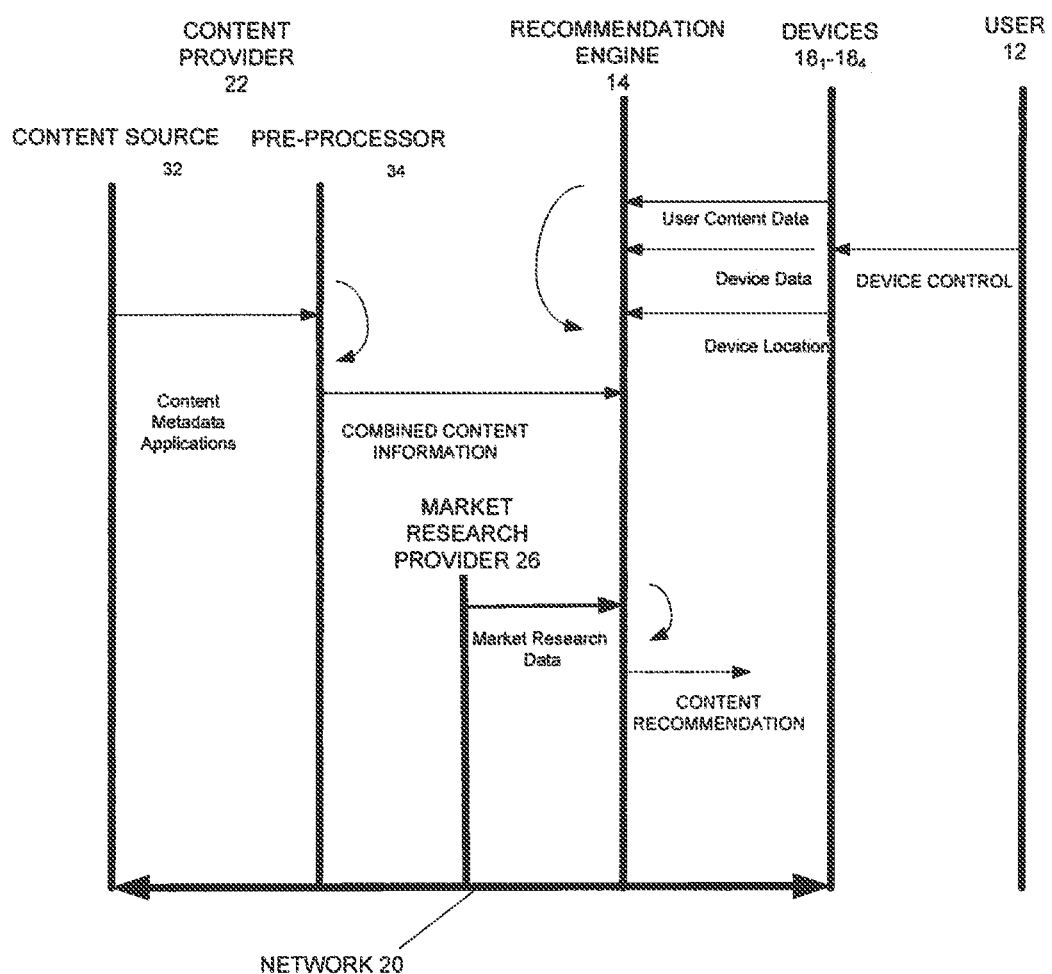
FIG. 2 depicts a sequence diagram showing the interaction of the various elements of the system of FIG. 1.

FIG. 2 depicts a sequence diagram showing the interaction among a content provider (e.g., content provider 22), the recommendation engine 14, the devices $18_1$-$18_5$ and the user 12, all of FIG. 1. As shown in FIG. 2, the user 12 controls one or more of the devices $18_1$-$18_5$ in communication with the recommendation engine 14 across the network 20. As discussed, the user 12 can initiate a content recommendation request by actuating one of the devices $18_1$-$18_5$ to signal the recommendation engine. Alternatively, the recommendation engine 14, on its own volition, can initiate a content recommendation for receipt on one or more of the devices $18_1$-$18_5$. In either event, the recommendation engine 14 will first determine the location of the devices in communication with it, as well as other devices at that location available to receive and consume content. For example, the user could make use of the tablet $18_3$ of FIG. 1 to transmit a content recommendation request to the recommendation engine 14. From the location of the tablet $18_3$ as well as content subscription information associated with the user 12, the recommendation engine 14 can determine which devices in addition to the device $18_3$ exist at the user's present location. Assuming that the user accesses the recommendation engine 14 from his or her residence 16, the recommendation engine 14 will detect the presence of devices $18_1$, $18_2$, $18_4$, and $18_5$ at the user's residence 16 in addition to device $18_3$.

Having identified which devices exist at the user's current location (e.g., residence 16), the recommendation engine 14 obtains data about the available devices. For example, the recommendation engine 14 can query the identified devices directly and receive data from the devices as to their properties. Alternatively, having determined which devices exist at the user's residence 16, the recommendation engine 14 can query a database (not shown) containing information about each of the identified devices. As discussed previously, depending on the user's current location, the user will either have the ability to access multiple devices or only a single device.

As discussed previously, the recommendation engine 14 also receives user content data. The user content data includes (1) content searches made by a user; (2) content requests made by the user; (3) Electronic Program Guide (EPG) requests made by the user; (4) content purchases/rentals made by the user, (5) when a user consumes auxiliary content when supplementing other content. Such information enables the recommendation engine to recommend content based on the user's content preferences, an attribute of the user.

In order to make appropriate content recommendations, the recommendation engine 14 needs to know what content exists, as well as the parameters associated with such existing content. As an example, the when recommending a full length motion picture, the recommendation engine 14 will take into account the size, resolution and run time, as examples of parameters associated with such content. In this way, the recommendation engine 14 can recommend content appropriate for the particular device(s) at the user's current location, taking into account the capabilities of such device(s) and the transmission mode used to transmit content.

To obtain information about available content, the recommendation engine 14 enjoys a link to each of the content providers, illustratively depicted in FIG. 2 by content provider 22. In practice, the content provider 22 includes one or more separate sources of content, metadata, and applications. A pre-processor 34 combines corresponding content, metadata, and/or applications to yield combined content information available for analysis by the recommendation engine 14. The combined content information typically includes identification data (e.g., the title of the content) and a brief description, which in the case of a movie would include a plot synopsis, date of first distribution, a list of major actors, and run time. In addition, the content information typically includes content parameters that indicate the resolution (HD or SD) and the type of content receiving devices that can readily consume such content. For example, the content parameters could indicate that the content includes audio (e.g., music or voice) and thus requires the media receiving device have audio playback capability.

As discussed with respect to FIG. 1, the recommendation engine 14 also receives market research data from the market research provider 26 through the network 20. The market research data typically trends regarding different content. For example, the market research data could indicate that a particular movie now enjoys great popularity, making such a movie a good candidate for recommendation even in the absence of any previous association with the user. As another example, the market research could indicate that users having certain demographics might prefer certain content. Under such circumstances, the recommendation engine 14 can make use of such information in formulating content recommendations for users who share such demographics.

The content recommendation provided by the recommendation engine 14 to the user 12 ultimately takes account of: (a) the user's profile (including the user's content profile, the user's device profile and the user's location profile) and (b) the content available for the devices current accessible to the user at the user's current location. In addition, the recommendation engine can (but need not) take account of market research trends in making content recommendations.

To better understand the manner in which the recommendation engine 14 of FIGS. 1 and 2 makes content recommendation based on location and device availability at that location, refer to FIGS. 3-6 which depict tables of content recommendations for different locations and device availability. FIG. 3 depicts a table of content recommendations for all devices at all locations. The content recommendations in the table of FIG. 3 include a recommendation for the video-on demand movie BATMAN BEGINS, which the user can access via the $18_3$, the personal computer $18_4$, or the smart telephone $18_2$ at any time. The table of FIG. 3 also includes a recommendation for content at available specific times, for example, the Local News on WMAQ-Channel 5 from 8:00-8:30 AM available on the user's PC $18_4$ and the user's television set $18_1$.

FIG. 4 depicts a table of content recommendations for a single device, for example, the user's PC $18_4$. Since the user's PC typically remains at the user's home (residence 16), the location (along with the device) remains constant in FIG. 4. Note that for a mobile device (e.g. smart phone $18_2$ or tablet $18_3$), the device would remain constant in FIG. 4, but the locations could vary. As discussed previously, different locations typically receive communications services via different networks so not all locations enjoy the same bandwidth. When making content recommendations, the recommendation engine 14 takes account of the transmission parameters associated with the user's current location to avoid recommending content that cannot readily undergo transmission to that location.

FIG. 5 depicts a table of content recommendations for a single location, e.g., a wireless "hot-spot" at which a user can obtain network access via devices such as the smart phone $18_2$, the tablet $18_3$, or a laptop computer (not shown). Because of the uncertainly as to the user's duration at such a location, the content recommendations only include content available on demand.

FIG. 6 depicts a table of content recommendations for devices that support two-screen applications and those that only support single screen applications. Presently certain content, such as feature length motion pictures and television programs contain audio-visual data (the movie or television program) as well as accompanying metadata that contains information about the audio-visual program. Thus, for example, in the case of a movie, the metadata can contain information about the actors or explanatory material regarding a particular scene and so on. The user would view the audio-visual program on a main display, such as television set $18_1$ or personal computer $18_4$, while viewing the metadata on another device, such as tablet $18_3$.

As seen in FIG. 6, the content recommendations include the on-demand movie Batman Begins, which supports two screens which can be the video of the movie Batman plus auxiliary content for a second screen (e.g., the personal computer $18_4$ and the tablet $18_3$) when the user 12 is located at his or her home (e.g., residence 16 in FIG. 1). The content recommendation further include the television program Game of Thrones available on the cable network HBO from 10:30 AM to 12:30 PM which likewise supports two screens (e.g., the personal computer 18$_4$ and the tablet 18$_3$) when the user 12 is located at his or her home. Note that the content recommendations depicted in FIG. 6 also include the movie Batman Begins for viewing while the user is located at work or at a hot spot. However, the movie Batman Begins will not have the two-screen feature enabled at those locations.

The foregoing describes a technique for making content recommendations to a user.

The invention claimed is:

1. Apparatus for making a content recommendation, comprising:
    means for establishing a physical location for the at least one user;
    means for determining which devices are available to the at least one user to use content at the physical location;
    means for establishing which content is available to the at least one user based on the at least one user's physical location and available devices;
    means for distinguishing between devices available to the at least one user, wherein a specific device is identified based on an action by the at least one user; and
    means for recommending among the available content selected content based on at least one attribute or action of the at least one user and the specific device.

2. The apparatus according to claim 1 wherein the means for recommending recommends auxiliary content for display on an auxiliary screen when available.

3. Apparatus for making a content recommendation, comprising:
    an analytics server for establishing a physical location for the at least one user and for determining which devices are available to the at least one user to use content at the physical location, and distinguishing between devices available to the at least one user, wherein a specific device is identified based on an action by the at least one user, and
    a recommendation server responsive to the physical location and available devices determined by the analytics server for establishing which content is available to the at least one user based on the at least one user's physical location and available devices, and for recommending among the available content selected content based on at least one attribute or action of the at least one user and the specific device.

4. The apparatus according to claim 3 wherein the analytics server determines the at least one user's physical location from at least one of GPS data, geolocation data and IP address lookup data.

5. The apparatus according to claim 3 wherein the analytics server queries all devices at the physical location to determine device availability.

6. The apparatus according to claim 3 wherein the analytics server queries a database containing information about devices existing at the physical location.

7. The apparatus according to claim 3 wherein the recommendation server establishes which content is available to the at least one user in accordance with device resolution capability.

8. The apparatus according to claim 3 wherein the recommendation server establishes which content is available to the at least one user includes in accordance with the transmission bandwidth capability of the available devices at the physical location.

9. The apparatus according to claim 3 wherein the recommendation server recommends selected content occurs in response to a request for a content recommendation.

10. The apparatus according to claim 3 wherein the recommendation server recommends selected content irrespective of whether a request for a content recommendation is received.

11. The apparatus according to claim 3 wherein the recommendation server recommends selected content taking account of market research data.

12. The apparatus according to claim 3 wherein the recommendation server recommends auxiliary content for display on an auxiliary screen when available.

* * * * *